(12) United States Patent
Mehta et al.

(10) Patent No.: US 9,069,613 B2
(45) Date of Patent: Jun. 30, 2015

(54) PROCESSING BATCH DATABASE WORKLOAD WHILE AVOIDING OVERLOAD

(75) Inventors: Abhay Mehta, Austin, TX (US); Chetan K. Gupta, Austin, TX (US); Umeshwar Dayal, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1547 days.

(21) Appl. No.: 12/242,707

(22) Filed: Sep. 30, 2008

(65) Prior Publication Data

US 2010/0083264 A1    Apr. 1, 2010

(51) Int. Cl.
G06F 9/46     (2006.01)
G06F 9/50     (2006.01)
G06F 9/48     (2006.01)

(52) U.S. Cl.
CPC ............ G06F 9/5011 (2013.01); G06F 9/4881 (2013.01); G06F 2209/5021 (2013.01)

(58) Field of Classification Search
CPC .............................. G06F 9/4881; G06F 9/5011
See application file for complete search history.

(56) References Cited

U.S. PATENT DOCUMENTS

| | | | |
|---|---|---|---|
| 3,411,139 A | 11/1968 | Lynch | |
| 5,437,032 A * | 7/1995 | Wolf et al. | 718/103 |
| 5,881,284 A | 3/1999 | Kubo | |
| 6,189,033 B1 | 2/2001 | Jin et al. | |
| 7,567,962 B2 | 7/2009 | Chakrabarti et al. | |
| 2002/0138679 A1 | 9/2002 | Koning | |
| 2002/0194251 A1 | 12/2002 | Richter et al. | |
| 2004/0267595 A1 | 12/2004 | Woodings et al. | |
| 2005/0144189 A1 * | 6/2005 | Edwards et al. | 707/102 |
| 2005/0160074 A1 | 7/2005 | Vos | |
| 2005/0235289 A1 | 10/2005 | Barillari | |
| 2006/0206900 A1 * | 9/2006 | Ooyama et al. | 718/105 |
| 2007/0100793 A1 | 5/2007 | Brown | |
| 2007/0106991 A1 | 5/2007 | Yoo | |
| 2007/0169125 A1 | 7/2007 | Qin | |
| 2007/0271570 A1 | 11/2007 | Brown | |
| 2008/0077932 A1 | 3/2008 | Ruppach | |
| 2009/0083238 A1 * | 3/2009 | Chaudhuri et al. | 707/4 |

* cited by examiner

*Primary Examiner* — Camquy Truong
(74) *Attorney, Agent, or Firm* — Michael A. Dryja

(57) ABSTRACT

Processing batch database workload while avoiding overload. A method for efficiently processing a database workload in a computer system comprises receiving the workload, which comprises a batch of queries directed toward the database. Each query within the batch of queries is assigned a priority. Resources of the computer system are assigned in accordance with the priority. The batch of queries is executed in unison within the computer system in accordance with the priority of each query thereby resolving a conflict within the batch of queries for the resources of the computer system, hence efficiently processing the database workload and avoiding overload of the computer system.

20 Claims, 5 Drawing Sheets

PROCESSING BATCH DATABASE WORKLOAD WHILE AVOIDING OVERLOAD

BACKGROUND

The time taken for a batch of database queries to run on a computer system depends on several factors such as, the memory within the CPU of the computer system, and the number of concurrent streams that are used to run the queries. The number of concurrent streams is known as MPL (Multi Programming Level). If the MPL is too low then the computer system may be under-loaded, i.e., the workload finishes later than if the number of concurrent streams had been increased and the computer system is underutilized.

For cost and efficiency reasons, database users attempt to achieve a higher throughput, as measured in queries finished per unit time by, increasing the MPL. There is a drawback with increasing the MPL. If the MPL is too high then the computer system may be overloaded, i.e., it runs into severe memory contention causing CPU thrashing. Thrashing is the CPU spending time or memory paging and refreshing processes, rather than performing the actual processes. Thrashing results in severe performance deterioration.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
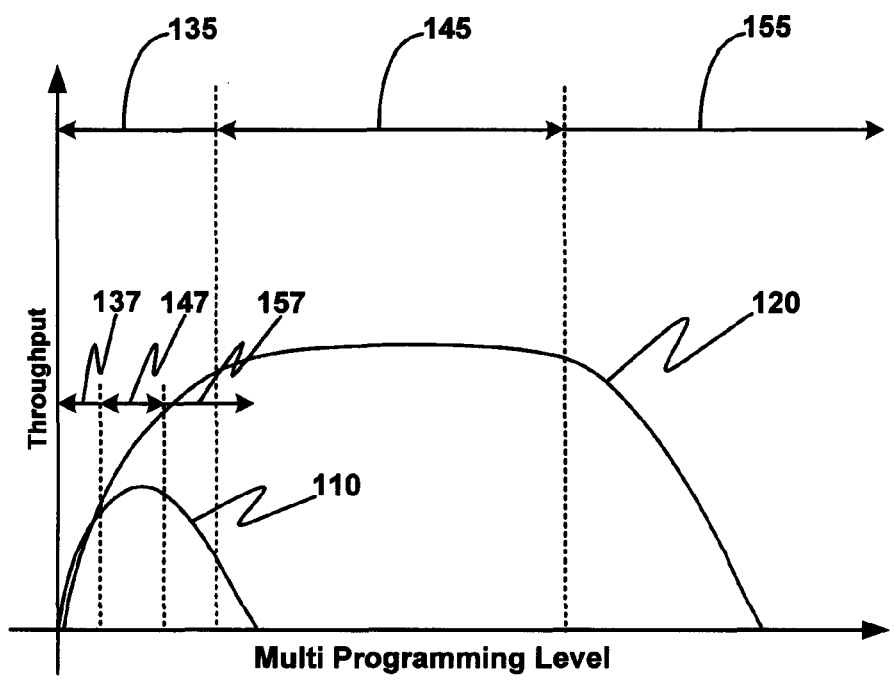
FIG. 1 is a plot of throughput verses multiple programming level, upon which embodiments of the present invention can be practiced.

The drawings referred to in this description are not be understood as being drawn to scale except if specifically noted.

DESCRIPTION OF EMBODIMENTS

Various embodiments of the present invention, processing batch database workload while avoiding overload, are described herein. In one embodiment, a method is described for processing batch database workload while avoiding overload. A method for efficiently processing a database workload in a computer system comprises receiving the workload, which comprises a batch of queries directed toward the database. Each query within the batch of queries is assigned a priority. The batch of queries is executed in unison within the computer system in accordance with the priority of each query thereby resolving a conflict within the batch of queries for the resources of the computer system, hence efficiently processing the database workload and avoiding overload of the computer system.

Reference will now be made in detail to the various embodiments of the invention, examples of which are illustrated in the accompanying drawings. While the invention will be described in conjunction with the various embodiments, it will be understood that they are not intended to limit the invention to these embodiments. On the contrary, embodiments of the invention are intended to cover alternatives, modifications and equivalents, which may be included within the spirit and scope of the invention as defined by the appended claims. Furthermore, in the following description of the various embodiments of the present invention, numerous specific details are set forth in order to provide a thorough understanding of embodiments of the present invention. In other instances, well known methods, procedures, and components have not been described in detail as not to unnecessarily obscure aspects of the embodiments of the present invention.

An enterprise data warehouse is a repository of company information residing within a computer database management system such as that provided by HP's Neo View, IBM's DB2, and similar systems provided by Oracle and Teradata. A common use of an enterprise data warehouse is to run a batch of queries directed towards the operation and business interests of the company. The objective is to get back the results of the queries in the shortest possible time. The amount of time taken for a batch of queries depends on several factors such as, the memory within the CPU of the computer database management system, the number of concurrent streams that are used to run the queries, i.e. the Multi Programming Level (MPL), and the size and complexity of queries within the batch of queries.

An enterprise data warehouse can be used by a company to perform business intelligence (BI) queries regarding its business practices. A workload of BI queries can have a wide spectrum of queries which run from a very simple and short query to a very large and complex query. For example, a BI query can be as simple as a request for a listing of a customer's phone numbers, which can require a microsecond to a millisecond for the computer system to run. A BI query can be as complex as a prediction of sales in the Americas region one year from now, which can require the computer system hours to answer.

Database workload comprising BI queries are difficult to manage efficiently in a computer system because of their variations in size and complexity. It is possible to run a database workload, comprised of a batch of queries, serially one query at a time. This is usually not done because it is not efficient and under-loads the computer system.

An optimal multi programming level allows a computer system to operate at an optimal throughput level, while avoiding under-load and avoiding overload (or thrashing). There are presently three basic methods for defining an MPL for a computer system. These are feed-forward methods, feed-back methods, and static MPL methods.

The feed-forward method estimates how much memory will be used by a database workload and to only admit the database workload if the computer system has enough free memory to accommodate the estimated memory of the database workload. The feed-forward method requires an accurate estimate of how much memory a database workload is going to use. The database workloads that are BI queries directed towards an enterprise data warehouse are typically very complex and difficult to estimate the memory required by the workload.

The feed-back method samples a performance metric and measures the performance metric to a predefined target value. If the performance metric exceeds the target value then the rate of admitting database workloads into the computer system is reduced. If the performance metric is less than the target value, then the rate of admitting database workloads into the computer system is increased. Thus, the performance metric is kept at an optimal rate, by controlling the admission of database workloads into the computer system. The feed-back method has been typically targeted towards on-line transaction processing (OLTP) where thrashing due to data contention has been the main problem. Some examples of the feed-back method well known in the art include but not limited to: adaptive control of the conflict ratio, half and half method, analytic model using a fraction of blocked transactions as the performance metric, wait-depth limitation, and real-time database systems.

The feed-back method involves choosing a sampling interval over which a performance metric is measured. If the sampling interval is too small, then the computer system could oscillate and become unstable. If the sampling interval is too large, then the computer system could become slow to react to a changing database workload and thus be susceptible to computer system overload and under-load. Typical BI database workloads shift rapidly between small queries and large queries. A performance metric and an associated sampling interval which is appropriate for one kind of database workload may not work for a different kind of workload occurring milliseconds later on the computer system. Thus the feed-back method is not appropriate for a rapidly changing BI database workload.

The static MPL method executes multiple times a predefined typical database workload through the computer database management system. Each run is performed with a different MPL setting, and the corresponding throughput is measured. The computer database management system operator uses best judgment to choose an MPL from these trial and error runs. Trial and error runs are expensive, inaccurate, and cannot handle a dynamic shift in the database workload. The resulting MPL might work marginally for the workload that was used in the testing, but is unlikely to work well with other database workloads. It is currently used by commercial computer database management systems because it is relatively easy to implement.

Embodiments of the present invention provide a method and system for efficiently processing a database workload in a computer system. A database workload comprises a batch of queries. In accordance with an embodiment of the present invention, a priority is assigned to each query within the batch. This creates a gradient of priority levels with one query occupying the highest priority, one query occupying the second-highest priority level, and so on. Each query is run in a computer system in accordance to the assigned priority of the query. The embodiments of the present invention are referred to as Priority Gradient Multiprogramming or PGM. PGM resolves conflict within a batch of queries for resources of the computer system, thereby efficiently processing the database workload and avoiding overload and thrashing of the computer system. Using PGM can also enhance the aforementioned feed forward method since it is less sensitive to memory requirement computation.

FIG. 1 is a plot 100 of throughput verses multiple programming level, upon which embodiments of the present invention can be practiced. Plot 100 models the throughput curves of two hypothetical database workloads (110, 120). Large database workload throughput curve 110 comprises several large, resource intensive queries. Medium database workload throughput curve 120 comprises several medium queries. The x-axis is the MPL and the y-axis is the throughput. Both database workload throughput curves (110, 120) show under-load area (135, 137). Increasing MPL for database workload throughput curves (110, 120) in under-load area (135, 137) can achieve a higher throughput. Medium database workload throughput curve 120 in optimal-load area 145 experiences very little change in throughput as MPL is increased. Large database workload throughput curve 110 in optimal-load area 147 experiences very little change in throughput as MPL is increased, however enters over-load area 157 quickly since resource demand on the CPU of the computer system decreases the span of optimal-load area 147. The optimal-load area 147 for large database workload throughput curve 110 is shorter as compared to optimal-load area 145 for medium database workload throughput curve 120. Database workload throughput curves (110, 120) in over-load area (155, 157) experience lower throughput as MPL is increased.

When a workload is first received, the shape of the throughput curve is unknown to the computer database management system operator. The computer database management system operator must determine the MPL at which to execute the workload. FIG. 1 demonstrates the difficulty of deriving an optimum MPL for workloads having varied resource demand on the CPU of a computer system. Workloads having varied resource demand on the CPU of a computer system can benefit from embodiments of the present invention.

PGM is a mechanism for executing queries in a computer database management system where every query or subgroup of queries is assigned a different priority. In the PGM mechanism the highest priority query or subgroup of queries gets the maximum share of the computer database management system resources. The remaining resources are automatically allocated to the query or subgroup of queries running at the second highest priority level. This continues down the priority gradient until all the system resources are fully utilized.

Figure 2:
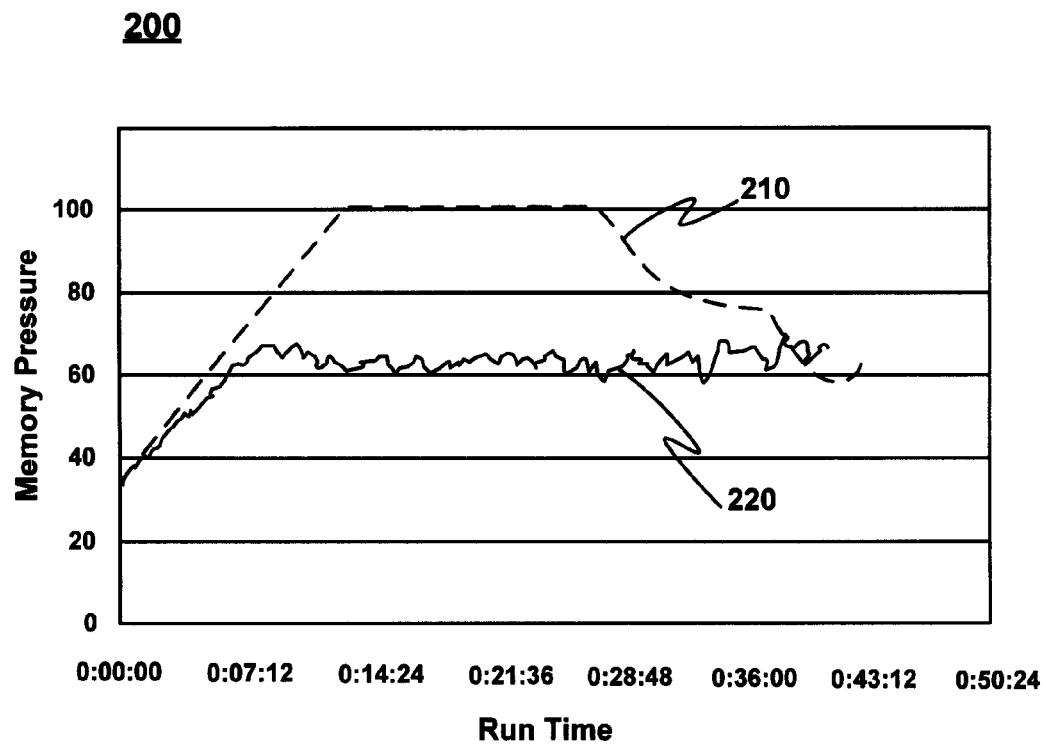
FIG. 2 is a plot of memory pressure verses run time, in accordance with an embodiment of the present invention.

FIG. 2, is a plot 200 illustrating memory pressure verses run time, in accordance with an embodiment of the present invention. Plot 200 presents two memory profiles (210, 220), i.e. memory used as a function of time, for a typical workload executed in a computer database management system. Memory profile 210 indicates the memory profile for a scheme where every query in the workload is assigned the same priority. This is referred to as an EPM (Equal Priority Multiprogramming) scheme. Memory profile 220 indicates the memory profile for PGM. The peak memory requirement associated with PGM memory profile 220 is substantially lower than the peak memory requirement associated with EPM memory profile 210. This clearly indicates that the peak memory requirement is reduced and thrashing is reduced and/or eliminated by embodiments of the present invention.

Memory builds up slowly and begins to taper off with time for PGM memory profile 220 of plot 200, FIG. 2. This occurs since queries with lower priority are not allowed by PGM to ask for memory resources from the CPU of the computer database management system. The saw toothed behavior of PGM memory profile 220 is an indicator of PGM freeing memory sooner than EPM. The higher priority queries for PGM are finished quicker than EPM and free their memory for use by the lower priority queries.

Figure 3:
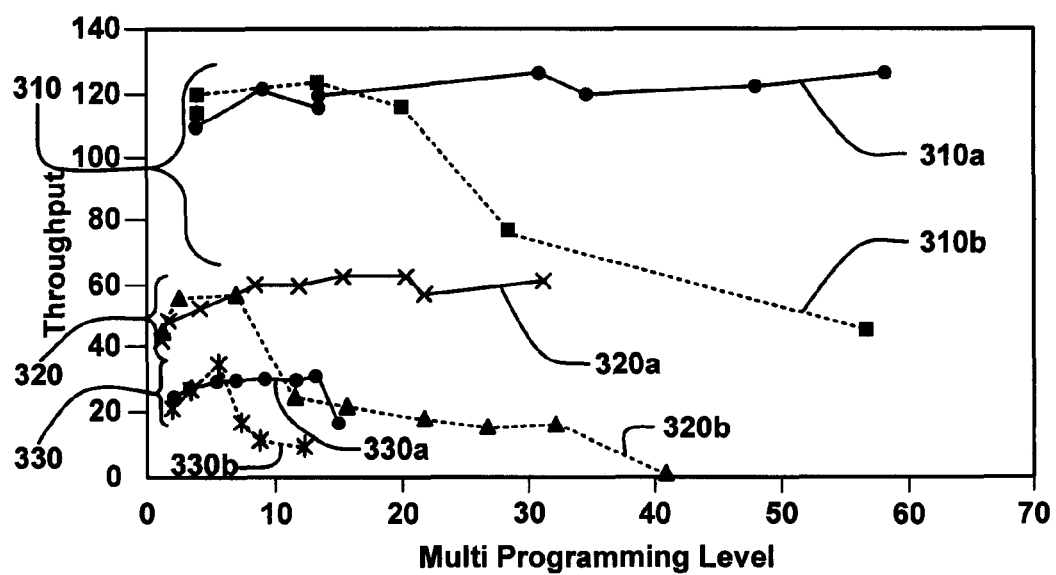
FIG. 3 is a plot of throughput verses multi programming level, in accordance with an embodiment of the present invention.

FIG. 3, is a plot 300 illustrating throughput verses multi programming level, in accordance with an embodiment of the present invention. Plot 300 presents throughput curves for three different workloads (310, 320, 330) composed of multiple copies of a single query. For each workload (310, 320, 330) two throughput curves have been plotted, a PGM throughput curve (310a, 320a, 330a) and an EPM throughput curve (310b, 320b, 330b). EPM throughput curves (310b, 320b, 330b) fall sharply in comparison to PGM throughput curves (310a, 320a, 330a). The sharp fall of EPM throughput curves (310b, 320b, 330b) is due to thrashing of resources associated with the CPU of the computer database management system.

Figure 4:
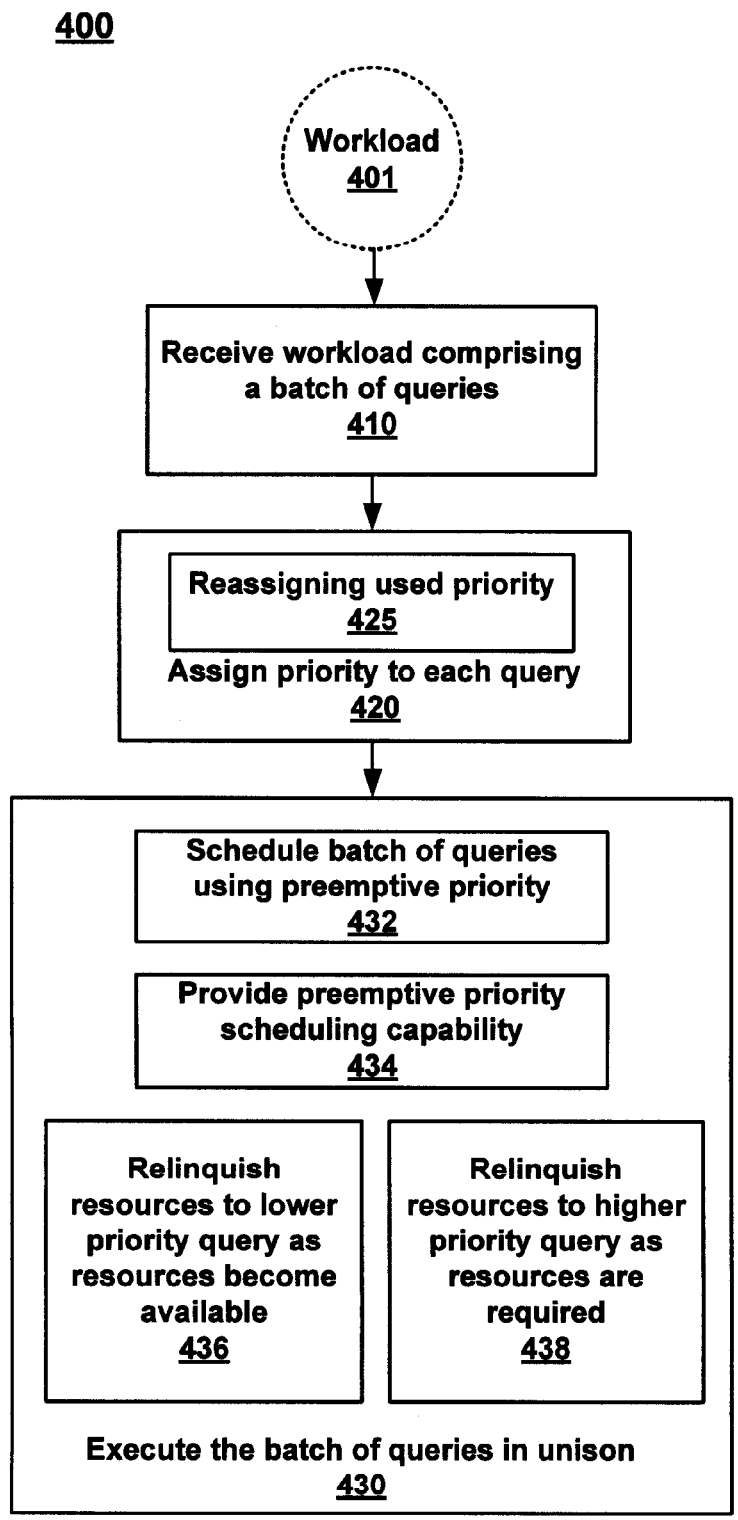
FIG. 4 is a flow chart illustrating a process for efficiently processing a database workload in a computer system, in accordance with an embodiment of the present invention.

FIG. 4 is a flow chart illustrating a process 400 for efficiently processing a database workload in a computer system, in accordance with an embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 400, such components are exemplary. That is, the embodiments of the present invention are well suited to performing various other components or variations of the components recited in FIG. 4. Within the present embodiment, it is appreciated that the components of process 400 may be performed by software, by hardware, by an assembly mechanism, through human interaction, or by any combination of software, hardware, assembly mechanism, and human interaction.

In 410 of process 400, workload 401 which comprises a batch of queries that are directed toward the database is received. In accordance with an embodiment of the present invention the database which the work load is directed towards comprises a data warehouse such as an enterprise data warehouse. An enterprise data warehouse is a repository of company information residing within a computer database management system such as that provided by HP's NeoView, IBM's DB2, and similar systems provided by Oracle and Terra Data. An enterprise data warehouse can be used by a company to perform business intelligence (BI) queries regarding its business practices.

In 420 of process 400, a unique priority is assigned to each query within the batch of queries comprising workload 401. Resources of the computer system are assigned in accordance with the priorities assigned in 420. In accordance with another embodiment of the present invention, 420 of process 400 comprises assigning one priority to at least one query. One priority can be assigned to more than one query. Multiple queries or a group of queries within workload 401 can have the same priority, which will differ from the priority assigned to another query or group of queries within workload 401. In accordance with an embodiment of the present invention, and element 425 of process 400, after a query has been completed, its priority can be reassigned to a new query.

In 430 of process 400, the batch of queries comprising workload 401 are executed in unison within the computer system. The resources of the computer system are allotted to the queries according to the priority they have been assigned. The highest priority query gets the maximum share of the computer resources required to execute the query. The remaining resources are automatically allocated to the query running at the second highest priority level. This continues down the priority gradient until all the computer resources are fully utilized.

In accordance with an embodiment of the present invention, and element 432 of process 400, the executing of batch of queries comprising workload 401 in unison, comprises scheduling the batch of queries using preemptive priority. The operating system typically has a preemptive priority scheduler, which is standard in many operating systems of a computer, such as HP's NSK and Linux. When a query arrives at the ready queue, its priority is compared with the priority of a currently running query. A preemptive priority scheduling algorithm will preempt the CPU of the computer if the priority of the newly arrived query is higher than the priority of the currently running query.

In accordance with an embodiment of the present invention, and element 434 of process 400, the executing of batch of queries comprising workload 401 in unison, comprises providing the computer system with preemptive priority scheduling capability when the computer system does not have a preemptive priority scheduler imbedded such as that typically standard in many operating systems.

In accordance with another embodiment of the present invention, and element 436 of process 400, executing the batch of queries in unison using preemptive priority further comprises relinquishing the resources of the computer system by a query having a higher priority, to a query having a lower priority, as the resources become available from the query having the higher priority. Examples of computer resources that are relinquished are CPU cycles and memory.

In accordance with another embodiment of the present invention, and element 438 of process 400, executing the batch of queries in unison using preemptive priority further comprises relinquishing the resources of the computer system, such as CPU cycles and memory, by the query having a lower priority, to the query having a higher priority, as the resources are required by the query having the higher priority.

In accordance with an embodiment of the present invention and process 400 presented in FIG. 4, conflict is resolved within a workload, comprising a batch of queries, for resources of a computer system. A database workload benefiting from embodiments of the present invention is processed efficiently, and overloading of the computer system is avoided.

Figure 5:
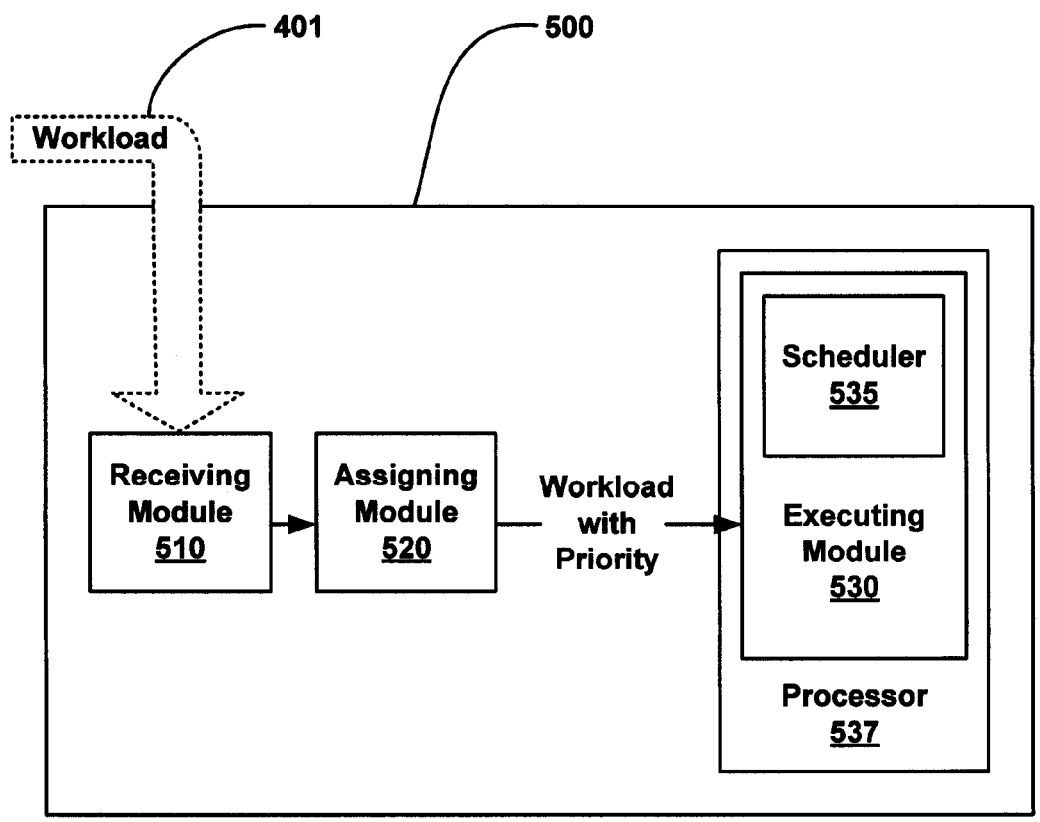
FIG. 5 is a block diagram of an exemplary processing system for a workload operable to a computer, in accordance with an embodiment of the present invention.

FIG. 5 is a block diagram illustrating an exemplary processing system 500 for a workload 401 operable to a computer, in accordance with an embodiment of the present invention. System 500 includes receiving module 510, assigning module 520, and executing module 530 which has scheduler 535. It is appreciated that system 500 can be implemented as software, hardware, firmware, or any combination thereof. Moreover, it is appreciated that system 500 may include additional components that are not shown so as to not unnecessarily obscure aspects of the embodiments of the present invention.

Receiving module 510 receives workload 401 into system 500. Workload 401 comprises a batch of queries having similar and varying degrees of complexity requiring varying degrees of computer resources. Receiving module 510 is configured to receive workload 401 comprised of a batch of queries. The complexity and computer resource requirements of the queries comprising workload 401 are unknown to system 500 prior to receiving workload 401. Receiving module 510 receives workload 401 into system 500 irrespective of the complexity of workload 401 and computer resource requirements of workload 401.

Assigning module 520 assigns a priority to each query within the batch of queries comprising workload 401. Assigning module 520 assigns a priority to each query comprised within workload 401 regardless of the complexity and computer resource requirements of the queries comprising workload 401. Computer resources are assigned in accordance with the priority assigned by assigning module 520. In accordance with an embodiment of the present invention, the same priority may be assigned to more than one query. Assigning module 520 presents the workload, with a priority assigned to each query in the batch of queries comprising workload 401, to executing module 530.

Executing module 530 executes the batch of queries in unison within the computer. The batch of queries is executed by executing module 530 as one workload in accordance with the priority of each query assigned by assigning module 520.

Executing module 530 is configured to preemptively schedule workload 401 using processor 537 of an operating system disposed within the computer. In accordance with another embodiment of the present invention, preemptive priority scheduling capability is provided when the computer system does not have a preemptive priority scheduler imbedded such as that typically standard in many operating systems.

In accordance with another embodiment of the present invention, executing module 530 comprises scheduler 535 for scheduling the batch of queries, which are comprised within workload 401. Scheduler 535 is configured to relinquish some of the computer resources of the computer by a query having a higher priority, to a query having a lower priority, as the computer resources become available from the query having the higher priority. Scheduler 535 is further configured to relinquish some of the computer resources of the computer by the query having the lower priority, to the query having the higher priority, as the computer resources are required by the query having the higher priority.

The present invention, in the various presented embodiments enables the efficient processing of a workload by a computer by resolving a conflict for computer resources between queries within the workload and avoiding overload and thrashing of the computer. For any given workload, embodiments of the present invention provide overload protection while maintaining high throughput. Priority Gradient Multiprogramming or PGM, enabled in the various embodiments of the present invention, remedies the shortcomings of practices known in the art of database workload management.

The feed-forward method for workload management uses a prediction of CPU memory that is needed to execute a workload. Accurate predictions are difficult to derive, and if not sufficiently accurate, can lead to under or over loading of the CPU memory. PGM does not need an accurate prediction of CPU memory to efficiently execute a workload.

The feed-back method for workload management involves choosing a sampling interval over which a performance metric is measured. A performance metric and an associated sampling interval which is appropriate for one kind of database workload may not work for a different kind of workload occurring milliseconds later on the computer system. PGM remedies the exposure of over and under loading of the computer suffered by the feed-back method to workload management, since PGM does not rely upon a sampling interval or measuring a performance metric to efficiently execute a workload.

The static MPL method for workload management relies upon trial and error to determine an MPL required to execute a database workload. This method can be time consuming and expensive. PGM does not rely upon pre-establishing an MPL to execute a database workload. PGM relies upon query priority for the efficient execution of a workload, and therefore avoids the expense and time consumed with trial and error associated with the static MPL method for workload management.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for efficiently processing a database warehouse workload in a computer system, said method comprising:
    receiving said workload, which comprises a batch of queries directed toward said database warehouse;
    assigning a priority to each query within said batch of queries, wherein said priority is unique within said batch of queries such that no two queries are assigned a same priority, whereby resources of said computer system are assigned in accordance with said priority;
    executing said batch of queries in unison within said computer system, using preemptive priority scheduling such that higher priority queries of the batch receive more computing resources for execution thereof than lower priority queries of the batch, in accordance with said priority of said each query, thereby resolving a conflict within said batch of queries for said resources of said computer system, hence efficiently processing said database workload and avoiding overload of said computer system;
    upon completion of execution of a first query of the batch having higher priority than a second query of the batch that is still executing and that has a next highest priority, reassigning the priority of the first query to the second query to heighten the priority of the second query, such that the second query receives additional computing resources for remaining execution thereof than the execution thereof prior to heightening of the priority of the second query.

2. The method of claim 1 wherein said assigning a priority to each query within said batch of queries comprises:
    assigning one said priority to at least one said query, wherein said priority is unique within said batch of queries.

3. The method of claim 2 wherein said assigning a priority to each query within said batch of queries comprises:
    reassigning one said priority to at least one new query, after said query originally assigned said priority has been completed.

4. The method of claim 1 wherein said method further comprises:
    coupling with a feed forward method for defining a multi programming level for processing said batch of queries.

5. The method of claim 1 wherein said executing said batch of queries in unison using preemptive priority further comprises:
    scheduling said batch of queries using an operating system comprised within said computer system.

6. A computer-readable memory containing executable instructions wherein said instructions when executed effect a method for efficiently processing a database workload in a computer system, said method comprising:
    receiving said workload which comprises a batch of queries directed toward said database;
    assigning a priority to each query within said batch of queries by which resources of said computer system are assigned in accordance with said priority;
    coupling with a feed forward method for defining a multi programming level for processing said batch of queries, wherein said feed forward method employs an accurate estimate of how much memory said database workload is going to use;

executing said batch of queries in unison within said computer system, using preemptive priority scheduling such that higher priority queries of the batch receive more computing resources for execution thereof than lower priority queries of the batch, in accordance with said priority of said each query, thereby resolving a conflict within said batch of queries for said resources of said computer system, hence efficiently processing said database workload and avoiding overload of said computer system; and upon completion of execution of a first query of the batch having higher priority than a second query of the batch that is still executing and that has a next highest priority, reassigning the priority of the first query to the second query to heighten the priority of the second query.

7. The computer readable memory as described in claim 6 wherein said receiving said workload comprises:
receiving said workload directed toward said database comprising a data warehouse.

8. The computer readable memory as described in claim 6 wherein said assigning a priority to each query within said batch of queries comprises:
assigning one said priority to at least one said queries.

9. The computer readable memory as described in claim 6 wherein said executing said batch of queries in unison using preemptive priority further comprises:
scheduling said batch of queries using an operating system comprised within said computer system.

10. The computer readable memory as described in claim 6 wherein said method further comprises, upon completion of execution of a first query of the batch having higher priority than a second query of the batch that is still executing and that has a next highest priority, reassigning the priority of the first query to the second query to heighten the priority of the second query.

11. The computer readable memory as described in claim 10, wherein reassignment of the priority of the first query to the second query is such that the second query receives additional computing resources for remaining execution thereof than the execution thereof prior to heightening of the priority of the second query.

12. The computer readable memory as described in claim 6, wherein upon priority reassignment, the second query receives additional computing resources for remaining execution thereof than the execution thereof prior to heightening of the priority of the second query.

13. A non-transitory computer readable storage medium having computer readable program code embedded thereon that when executed causes a computer system to process a database workload, said program code comprising:
a receiving module for receiving said workload, wherein said workload comprises a batch of queries;
an assigning module for assigning a unique priority to each query within said batch of queries such that no two queries are assigned a same priority and where no two queries can be assigned the same priority, wherein resources of said computer are assigned in accordance with said priority; and
an executing module for executing said batch of queries in unison within said computer in accordance with said priority of said each query, therein resolving a conflict between said queries for said resources of said computer, hence efficiently processing said workload and avoiding overload of said computer,
wherein upon completion of execution of a first query of the batch having higher priority than a second query of the batch that is still executing and that has a next highest priority, the assigning module is to reassign the priority of the first query to the second query to heighten the priority of the second query.

14. The non-transitory computer readable storage medium as described in claim 13 wherein said executing module comprises a scheduler for scheduling said batch queries using preemptive priority.

15. The non-transitory computer readable storage medium as described in claim 14 wherein said scheduler is configured to relinquish said resources of said computer by a query having a higher priority, to query having a lower priority, as said resources become available from said query having said higher priority.

16. The non-transitory computer readable storage medium as described in claim 14 wherein said scheduler is configured to relinquish said resources of said computer by a query having a lower priority, to a query having a higher priority, as said resources are required by said query having said higher priority.

17. They non-transitory computer readable storage medium as described in claim 13 wherein said executing module is configured to preemptively schedule said workload using a processor of an operating system disposed within said computer.

18. The non-transitory computer readable storage medium as described in claim 13 wherein upon completion of execution of a first query of the batch having higher priority than a second query of the batch that is still executing and that has a next highest priority, said assigning module reassigns the priority of the first query to the second query to heighten the priority of the second query.

19. The non-transitory computer readable storage medium as described in claim 18 wherein said assigning modules reassigns the priority of the first query to the second query such that the second query receives additional computing resources for remaining execution thereof than the execution thereof prior to heightening of the priority of the second query.

20. The non-transitory computer readable storage medium as described in claim 13, wherein upon priority reassignment, the second query receives additional computing resources for remaining execution thereof than the execution thereof prior to heightening of the priority of the second query.

* * * * *

UNITED STATES PATENT AND TRADEMARK OFFICE
CERTIFICATE OF CORRECTION

PATENT NO. : 9,069,613 B2  
APPLICATION NO. : 12/242707  
DATED : June 30, 2015  
INVENTOR(S) : Abhay Mehta et al.

Page 1 of 1

It is certified that error appears in the above-identified patent and that said Letters Patent is hereby corrected as shown below:

In The Claims

In column 10, line 31 approx., in Claim 17, delete "They" and insert -- The --, therefor.

Signed and Sealed this
Seventeenth Day of November, 2015

Michelle K. Lee
*Director of the United States Patent and Trademark Office*